(12) United States Patent
Jones et al.

(10) Patent No.: US 8,255,607 B2
(45) Date of Patent: Aug. 28, 2012

(54) SAS EXPANDER-BASED SAS/SATA BRIDGING

(75) Inventors: Marc Timothy Jones, Costa Mesa, CA (US); Murthy Kompella, Costa Mesa, CA (US); Thomas Vincent Spencer, Costa Mesa, CA (US); Carl Joseph Mies, Costa Mesa, CA (US); Sammy Dwayne Sawyer, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 477 days.

(21) Appl. No.: 12/613,390

(22) Filed: Nov. 5, 2009

(65) Prior Publication Data

US 2011/0107002 A1    May 5, 2011

(51) Int. Cl.
*G06F 13/36* (2006.01)
*G06F 13/00* (2006.01)

(52) U.S. Cl. .................................................. 710/316
(58) Field of Classification Search ........... 710/305–317
See application file for complete search history.

(56) References Cited

U.S. PATENT DOCUMENTS

| | | | |
|---|---|---|---|
| 6,473,827 B2 * | 10/2002 | McMillen et al. | 710/316 |
| 6,988,162 B2 * | 1/2006 | Goergen | 710/317 |
| 7,058,749 B2 * | 6/2006 | Loffink | 710/313 |
| 7,167,929 B2 | 1/2007 | Steinmetz et al. | |
| 7,320,084 B2 | 1/2008 | Steinmetz et al. | |
| 7,353,321 B2 | 4/2008 | Steinmetz et al. | |
| 7,363,404 B2 * | 4/2008 | Boyd et al. | 710/104 |
| 7,539,798 B2 * | 5/2009 | Voorhees et al. | 710/74 |
| 7,552,262 B1 * | 6/2009 | Turner et al. | 710/302 |
| 7,584,319 B1 * | 9/2009 | Liao et al. | 710/317 |
| 7,644,168 B2 * | 1/2010 | Grieff et al. | 709/229 |
| 7,668,925 B1 * | 2/2010 | Liao et al. | 709/212 |
| 7,739,432 B1 * | 6/2010 | Shaw et al. | 710/74 |
| 7,822,908 B2 * | 10/2010 | Stenfort | 710/315 |
| 2006/0101171 A1 * | 5/2006 | Grieff et al. | 710/36 |
| 2009/0003197 A1 | 1/2009 | Jones | |
| 2009/0007155 A1 | 1/2009 | Jones et al. | |

\* cited by examiner

*Primary Examiner* — Paul R Myers
(74) *Attorney, Agent, or Firm* — Morrison & Foerster LLP

(57) ABSTRACT

Described herein is an improved mechanism for bridging between SAS and SATA drives based upon existing SAS expanders in a SAS domain. In particular, a bridge capable of translating between SAS and SATA protocols is embedded in or coupled to an expander. When a SAS initiator request is received at the expander, the expander can route the request, based on a routing table, either directly to a destination SAS device or to the bridge for necessary translation before it is transmitted to a destination SATA drive. The routing table includes corresponding relationships between all SAS addresses and Phys through which those SAS and SATA devices are attached to the expander. SATA devices can be virtualized in the expander through a few assigned addresses in the routing table in a SAS discovery process.

51 Claims, 10 Drawing Sheets

SAS EXPANDER-BASED SAS/SATA BRIDGING

FIELD OF THE INVENTION

This relates generally to bridging between Serial ATA (SATA) and Serial Attached Small Computer System Interface (SAS) protocols in a computer storage network, and more particularly, to providing bridging and routing functionalities between SAS and SATA drives based upon existing SAS expanders in a SAS domain.

BACKGROUND OF THE INVENTION

A typical SAS system consists of several basic components, including initiators, targets, and expanders. The expanders, akin to a network switch, are used to facilitate communications between multiple initiators and targets. The targets can be SAS disks or inexpensive SATA drives. Accordingly, in addition to the Serial SCSI Protocol (SSP) for supporting SAS disk drives and Serial Management Protocol (SMP) for managing SAS expanders, a third transport protocol, namely, Serial ATA Tunneling Protocol (STP) is also used for supporting SATA disks. However, there are a couple of connectivity issues with STP and SATA drives in a SAS domain. For example, SAS supports multiple initiators, while SATA drives only permit single-user access. In order to provide the multi-initiator capability with respect to SATA drives in a SAS domain, multiple affiliations need to be created within a SAS expander for controlling access to the SATA drives. This inevitably adds technical complexity and implementation cost in building SAS expanders. In addition, STP is a half-duplex protocol with inefficient data connections, especially in view of the multi-path I/O capability provided in the SAS domain. Such inefficiency can cause bottlenecks in data transport and reduce the overall performance of the SAS domain. Therefore, there is a need to bridge between these two different protocols of SAS and SATA so as to better integrate SATA drives into a SAS domain and enhance the overall performance of a SAS-supported computer storage network.

SUMMARY OF THE INVENTION

Embodiments of the present invention relate to providing a bridging functionality between SAS and SATA drives based upon existing SAS expanders in a SAS domain.

In particular, one embodiment of the present invention provides a method of bridging SATA and SAS protocols in a computer storage network that comprises at least an expander that includes multiple Phys indicative of multiple ports, and a plurality of SAS devices and/or SATA devices directly attached to the expander. Under this method, a bridge is created for performing translations between SAS and SATA protocols and is embedded in or coupled to the expander through two or more Phys amongst the multiple Phys of said expander, wherein the two or more Phys comprise at least an ingress Phy and an egress Phy attached to the bridge. Further, a SAS initiator request is routed to the bridge based on a routing table in the expander before the initiator request is translated at said bridge and further routed from the bridge to a destination SATA device attached to the expander. More specifically, the routing table in this method includes public addresses of the SAS and SATA devices and corresponding Phys through which the SAS and SATA devices are attached to the expander, the SAS initiator request indicates a destination address that corresponds to the ingress Phy of the bridge according to the routing table, and the SATA devices including the destination SATA device are virtualized as Serial SCSI Protocol (SSP) targets during a SAS discovery process.

According to another embodiment of the invention, an expander is configured for bridging between Serial ATA (SATA) and Serial Attached Small Computer System Interface (SAS) protocols in a computer storage network, where said storage network comprises a plurality of SAS devices and SATA devices directly attached to said expander. Such an expander comprises a plurality of ports represented by a plurality of Phys, a bridge internally attached to two or more Phys amongst said plurality of Phys, said two or more Phys comprising at least an ingress Phy and an egress Phy attached to said bridge, said bridge capable of performing translations between SAS and SATA protocols; and a switch configured to establish connections and route data between said plurality of Phys, said switch including a routing table that comprises public addresses of said SAS and SATA devices and corresponding Phys through which said SAS and SATA devices are directly attached to said expander, and one or more assigned addresses corresponding to said ingress Phy of said bridge, wherein said switch is further configured to route a SAS initiator request based on said routing table to either a destination SAS device directly or said bridge for translation before it is transmitted to a destination SATA device.

One embodiment of the invention also provides a bridging apparatus configured for bridging between Serial ATA (SATA) and Serial Attached Small Computer System Interface (SAS) protocols in a computer storage network, where the storage network comprises at least an expander coupled to the bridging apparatus, and a plurality of SAS devices and SATA devices connected to the expander. Specifically, the bridging apparatus comprises a plurality of Phys corresponding to two or more Phys in the expander, wherein said two or more Phys include at least an ingress Phy and an egress Phy through which said bridge apparatus is attached to said expander. The bridging apparatus further comprises a bridge component coupled to said plurality of Phys, said bridge component capable of performing translations between SAS and SATA protocols, a context memory accessible to said bridge component, said context memory storing information relating to Inputs/Outputs (I/Os) going through said expander; and a buffer coupled to said bridge component, said buffer configured to store data relating to any received SAS initiator requests. Within the bridging apparatus, the bridge component is configured to receive a SAS initiator request from said expander at said ingress Phy, translate said initiator request into an STP request and route said STP request to a destination SATA device attached to said expander, and the SAS initiator request indicates a destination address that corresponds to said ingress Phy according to a routing table in said expander, and the routing table includes public addresses of said SAS and SATA devices and corresponding Phys in said expander through which said SAS and SATA devices are directly attached to said expander, and one or more assigned addresses corresponding to said ingress Phy.

Yet another embodiment is directed to a method of virtualizing a SATA device as an SAS device from an initiator perspective in a computer storage network comprising at least an expander that includes multiple Phys indicative of multiple ports, said storage network further comprising a plurality of SAS devices and/or SATA devices directly attached to said expander. This methods comprises the steps of: receiving a discovery request at said expander, said discovery request investigating each Phy of said multiple Phys of said expander to discover its local attachment; in response to said discovery request, reporting from a first Phy attached to a SAS device that said first Phy is attached to an SSP target, and an address of said SSP target is the unique SAS address of said SAS device; and reporting from a second Phy attached to a SATA device that said second Phy is also attached to an SSP target instead of a Serial ATA Tunneling Protocol (STP) target, and an address of said SSP target is an assigned address selected from one or more assigned addresses stored in a routing table instead of a unique address assigned to said SATA device, said one or more assigned addresses corresponding to an ingress Phy of a bridge embedded in or coupled to said expander, said bridge capable of performing translations between SAS and SATA protocols.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Embodiments of the present invention relate to providing a bridging functionality between SAS and SATA drives based upon existing SAS expanders in a SAS domain. In particular, embodiments of the present invention provide a bridge that is embedded in or coupled to an expander and capable of translating between SAS and SATA protocols. When a SAS initiator request is received at the expander, the expander can route the request, based on a routing table, either directly to a destination SAS device or to the bridge for necessary translation before it is transmitted to a destination SATA drive. The routing table includes corresponding relationships between addresses of all SAS and SATA devices connected to the expander and respective Phys through which those devices are attached to the expander. The routing table also includes a few internal addresses that correspond to an ingress Phy connected to the bridge. These internal addresses are used in a discovery process to virtualize SATA devices as SSP targets. Specifically, in response to a discovery request, SATA devices connected to the expander would be reported as SSP targets instead of STP targets, and the reported addresses would be those internal addresses rather than addresses assigned to the SATA devices.

Although embodiments of the invention may be described and illustrated herein in terms of SAS and SATA protocols (e.g., SSP, STP, SMP), it should be understood that applicability of embodiments of the present invention is so not limited to these existing standards and protocols. In addition, although embodiments of the invention may be described and illustrated herein through exemplary network and device configurations, it should be understood that many variations can be implemented without departing from the spirit and scope of embodiments of the present invention.

Figure 1:
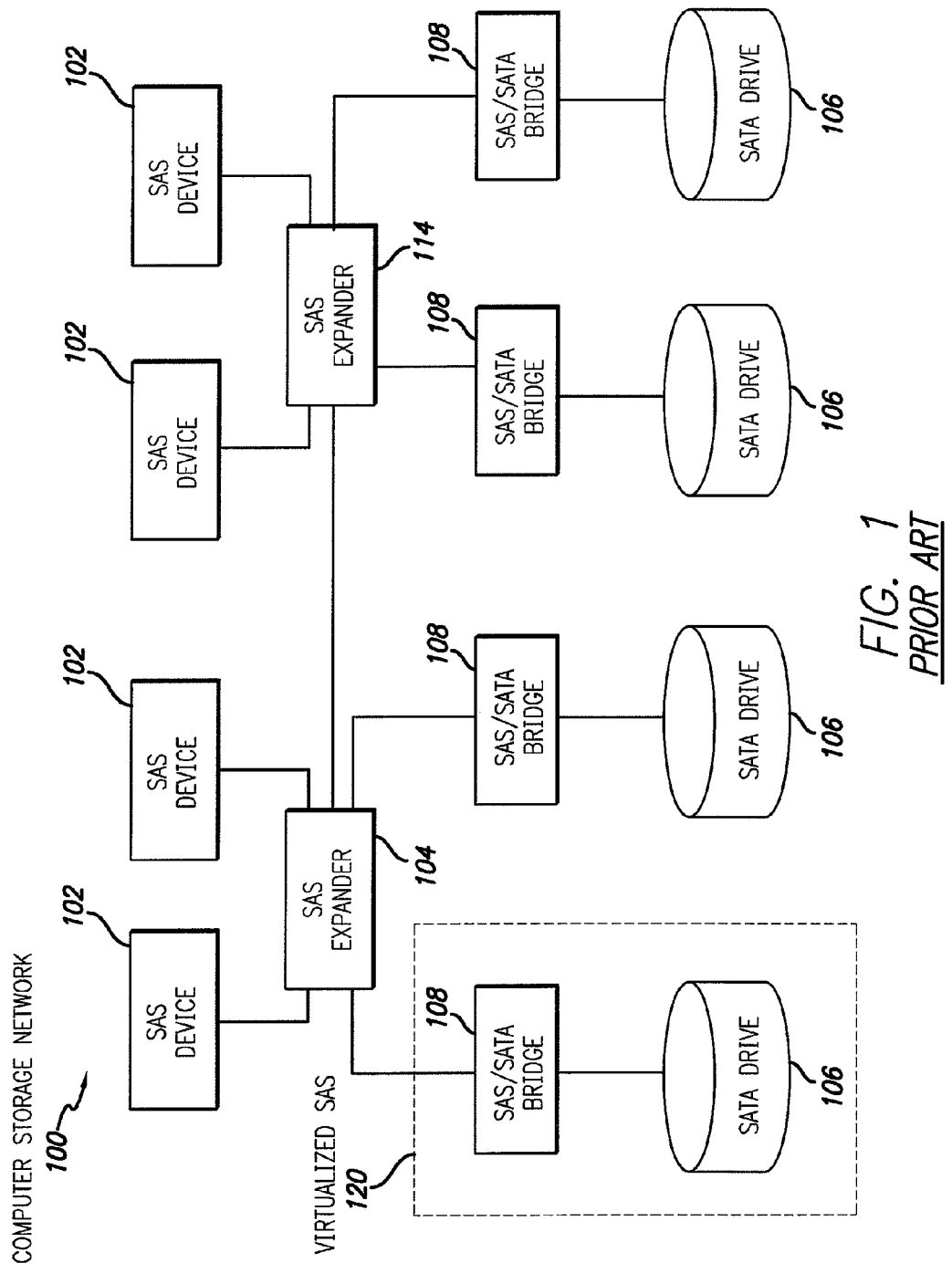
FIG. 1 is a diagram illustrating an exemplary conventional computer storage network with SAS/SATA bridges implemented therein for bridging between SAS and SATA devices.

Referring now to FIG. 1, an exemplary computer storage network 100 with SAS/SATA bridges implemented therein will be described according to various embodiments of the present invention. In FIG. 1, a storage array including two types of devices, e.g., SAS devices 102 and SATA disk drives 106, can be commonly connected to the exemplary storage network 100 via one or more SAS expanders, such as the inter-connected SAS expanders 104 and 114. As will be described in detail hereinbelow, a SAS device typically has dual ports which allow the device to be connected to both expanders concurrently, while a single-ported SATA device can only be attached to one expander without using other components such as a multiplexer. Although only two expanders are illustrated in FIG. 1, it should be understood that any number of expanders can be used in actual implementation of a SAS-supported storage network.

Figure 2:
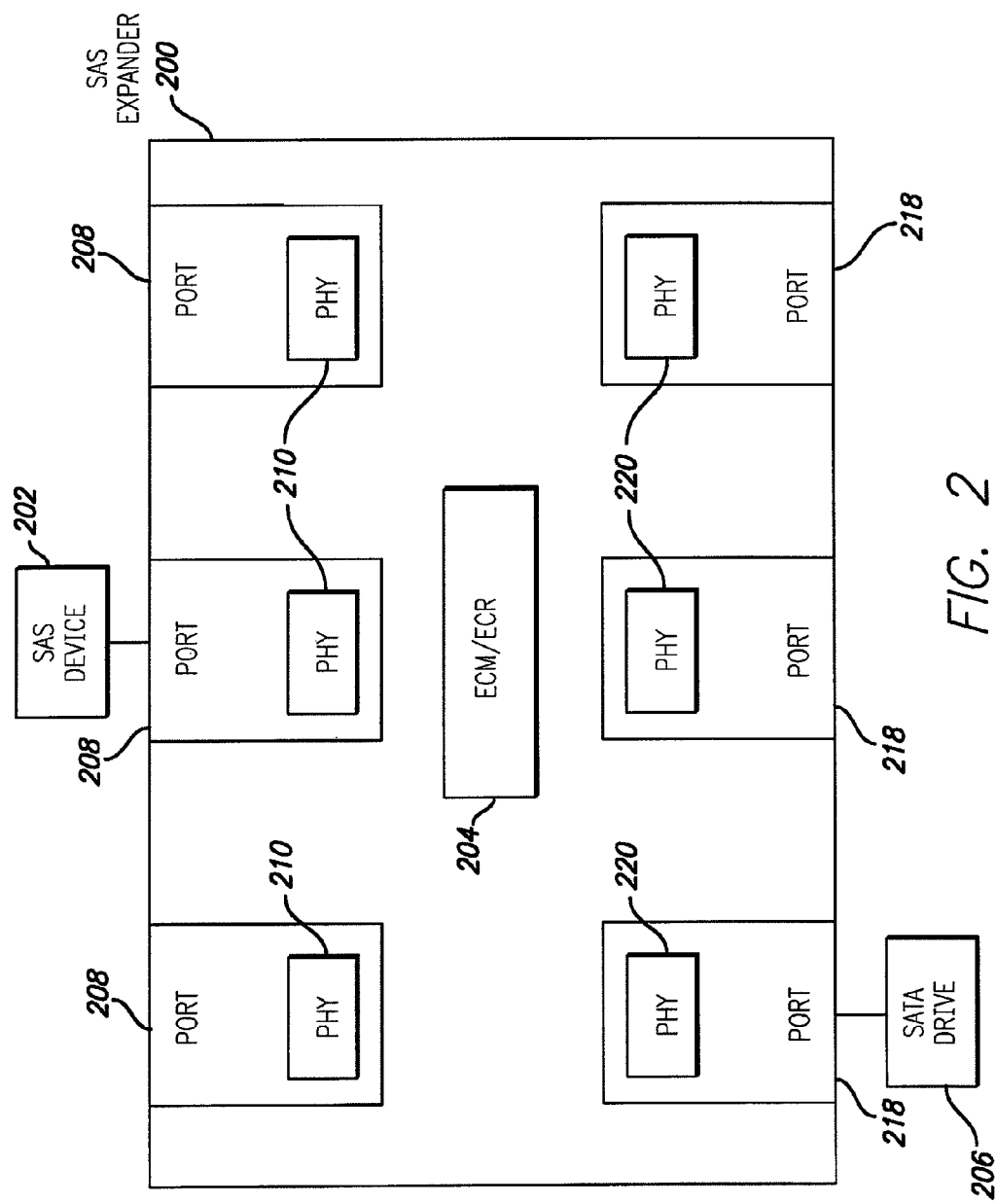
FIG. 2 depicts an exemplary configuration of a SAS expander of FIG. 1 according to various embodiments of the present invention.

FIG. 2 shows a typical internal configuration of a SAS expander for connecting SAS and SATA devices. As shown in FIG. 2, a SAS expander 200 includes a plurality of SAS ports 208 and associated Phys 210, through which a number of SAS devices 202 can be connected into a storage network. The SAS expander also includes a plurality of ports 218 and associated Phys 220 for connecting to SATA drives 206. In addition, the expander includes a central switch module 204 that includes an expander connection manager (ECM) for allowing pathways to be built between any two Phys and an expander connection router (ECR) for determining routing connections between different Phys. As specified in the SAS technical specification (e.g., SAS-1.1, SAS-2), each SAS device in a SAS domain has a unique 64-bit World Wide Name or SAS address. This means, each SAS device can be uniquely identified by its SAS address no matter which expander or which port of the expander it is attached to. In contrast, currently SATA devices do not have such unique SAS addresses. In order to make a SATA drive visible to other devices in the network, the expander to which the SATA drive is connected needs to assign an address to the SATA drive. Specifically, each SAS expander port maintains a SATA Tunneling Protocol (STP) SAS address that can be used to uniquely identify a SATA device connected thereto. When a SATA drive is connected to a particular port in the expander, it would be assigned with the STP SAS address maintained in that particular port. However, this can cause some addressing problems. For instance, if a SATA drive is connected to one port of the expander, it will be assigned with an address X by this port, and when the SATA drive is moved to another port, the SATA drive will be assigned with a new address Y by that port because the address X only stays with the previous port. If the initiator is unaware of the address change, data can be written into or read from the wrong SATA device, thereby resulting in data corruption. Therefore, certain security mechanisms have to be used to prevent such erroneous data delivery. One approach is to add a broadcast change notification (BCN) module in the expander for notifying the address change to all other devices including the initiator in the network, although such notification would put all SATA drives on hold and cause delays in communications. Another solution is to offer dynamic STP address, as stated in the US Patent Application Publication 20090007155, entitled "Expander-based solution to the dynamic STP address problem." Inevitably, most existing solutions increase the cost and technical difficulty in implementing SAS expanders. In addition, any given port in a SAS expander can be directly attached to SAS devices requiring Serial SCSI Protocol (SSP), or directly connected to SATA drives for which the Serial ATA Tunneling Protocol (STP) needs to be supported. SSP is a full-duplex protocol, while STP is a half-duplex protocol that is much less efficient in comparison. As a result, each port of the SAS expander needs to be able to recognize different protocols and translate between SAS and SATA. Furthermore, due to the single-user-access nature of SATA drives, SAS expanders need to provide appropriate interfaces (e.g., affiliations) that enable multi-initiator access so that the SATA drives can be integrated seamlessly in the SAS domain. This adds another layer of complexity to SAS expanders.

In an attempt to address the above problems, various solutions have been offered to bridge between SAS and SATA protocols. One approach, as illustrated in FIG. 1, introduces a centralized SAS/SATA bridge between a SATA drive and the storage network. Back to FIG. 1, a SAS/SATA bridge 108 is embedded within or attached to a SATA drive 106. From the perspective of a SAS expander, such as the expander 104, the SATA drive 106 appears to be a virtualized SAS device 120. Because the SAS/SATA bridge 108 is configured with necessary bridging and translating functionalities between different protocols, the SAS expander or any port thereof does not need to be modified or re-configured for the same purpose, thereby reducing the implementation cost and difficulty associated with the SAS expanders. However, the drawback with this solution is, each SATA drive needs to be equipped with a SAS/SATA bridge, which can be prohibitively expensive given the large number of SATA drives to be used in a storage network. Also, adding one more component such as this bridge can also give rise to performance concerns to SATA drives. Therefore, a need still exists for better bridging solutions between SAS and SATA protocols in a SAS-supported computer storage network.

Referring to FIGS. 3a-b, 4, 5a-c, illustrated therein is an improved bridging solution that, in general, embeds a shared multi-port SAS/SATA bridge transparently within a SAS expander according to various embodiments of the invention. This solution is based on the SAS expander, which is a necessary and existing element in a SAS domain, and does not require any additional components to be built into the storage network or any modifications to the existing protocols.

Figure 3A:
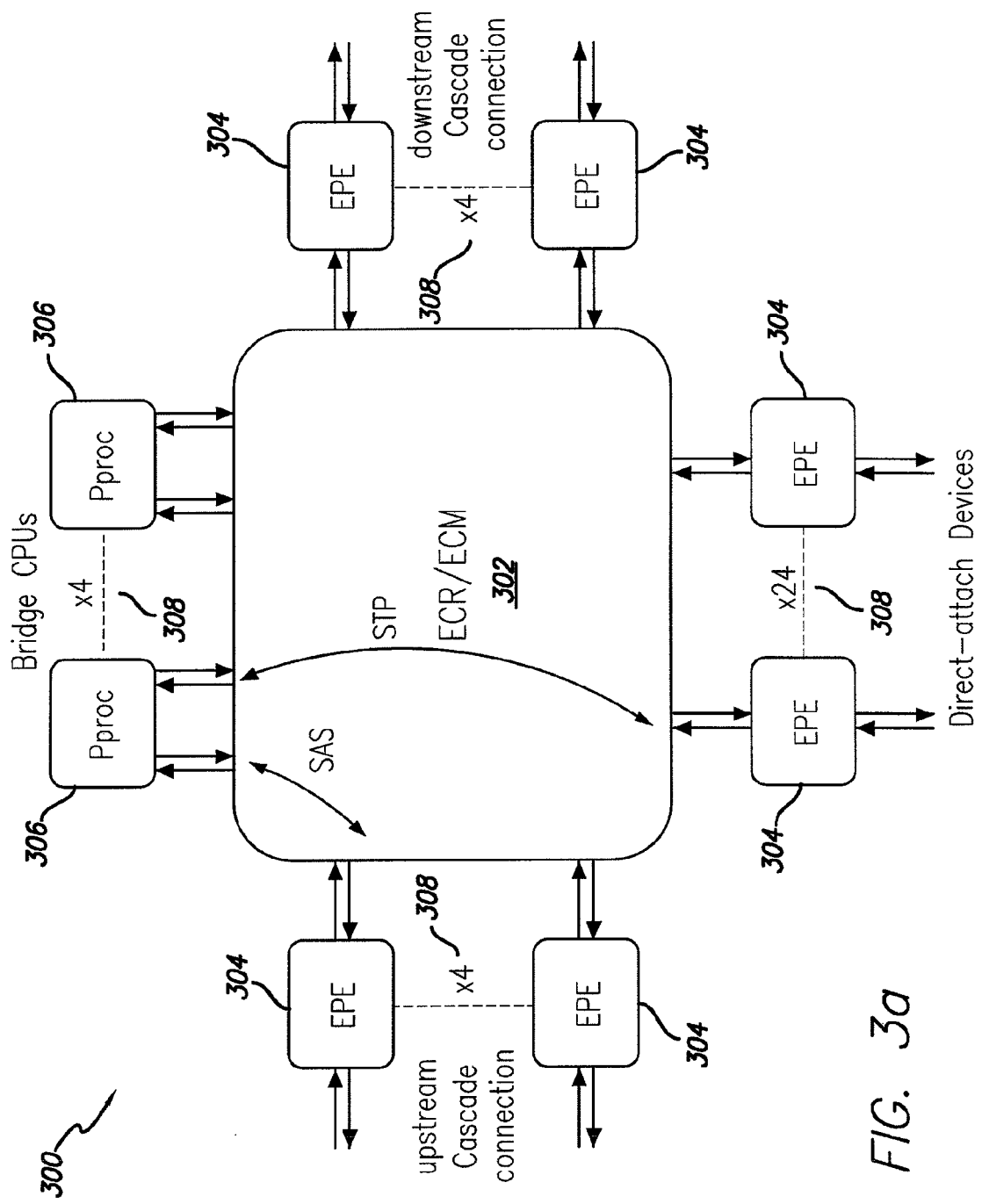
FIG. 3a is a diagram illustrating an exemplary SAS expander with an enhanced SAS/SATA bridging functionality and an exemplary routing process implemented therein according to various embodiments of the present invention.

FIG. 3a illustrates an exemplary SAS expander 300 with enhanced SAS/SATA bridging functionalities. As shown in FIG. 3a, the expander 300 includes an ECR/ECM module 302 for building connections between different Phys and routing data requests from initiators to targets transparently within the storage network. The expander also includes a plurality of ports and Phys (not shown) that can be connected to various initiators, targets or other expanders within the network through their respective expander port engines (EPE) 304. Typically, the EPE is configured to support dual protocols so that the port can communicate with both SSP targets and STP targets. It should be noted that FIG. 3a shows an exemplary 36-port SAS expander, although embodiments of the invention are not so limited, and can utilize expanders with any number of ports contained therein. In one embodiment, the expander 300 in FIG. 3a is such configured that among the exemplified 36 ports, four ports on the left side are reserved for upstream cascade connections, four ports on the right side are reserved for downstream cascade connections, four ports on the top for connecting internal bridge CPUs (e.g., the protocol processors 306), and the remaining 24 ports at the bottom are reserved for connecting direct-attached devices, including both SAS devices and SATA drives. Note that in both upstream and downstream directions, the expander can be connected to an initiator or another expander in the SAS domain, and the architecture of connections can be a cascade, tree or any other type known in the art.

The existing or generic SAS expanders do not provide any bridging functionality and simply serve as a switch for routing a SAS initiator request to a destination port connecting to a target, where the target can be a SAS device or SATA device. If the target is a SATA drive, the destination port or a SAS/SATA bridge coupled to the SATA drive (as shown in FIG. 1) can perform necessary translation and form STP packets for the SATA drive. As compared to the existing expanders, the bridge-enhanced expander in FIG. 3a is configured with a centralized bridging functionality performed by one or more bridge CPUs in the expander, such as the protocol processors 306. Specifically, when an initiator request is received at the ECR/ECM 302 of the expander 300, a destination address can be identified, which suggests whether the target is a SAS or SATA device and whether the request is directly delivered to the SAS target or routed to the internal bridge. If the target is determined to be a SAS device, the ECR/ECM 302 can route the request to the SAS device. If the target is a SATA device, the request will be routed to the bridge processors 306, which perform necessary translation from SAS to SATA in respect of the initiator request and communicate the formed STP packets to the destination SATA device. This process will be described in detail below, with reference to FIG. 3b.

Figure 3B:
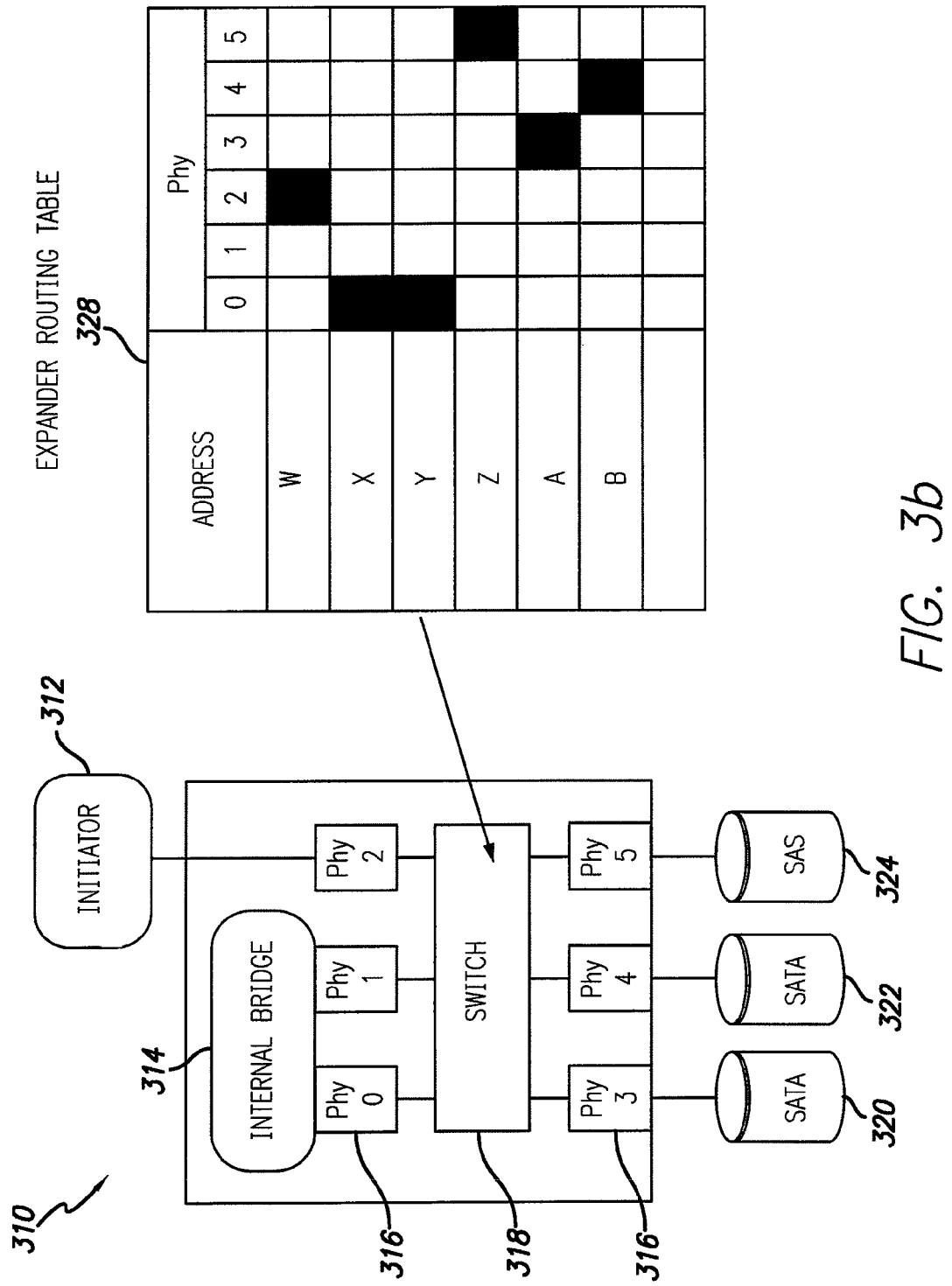
FIG. 3b provides a detailed view of the bridge-enhanced expander of FIG. 3a and a discovery and routing process implemented therein according to various embodiments of the present invention.

FIG. 3b provides a detailed view of a bridge-enhanced expander 310, which includes an internal bridge 314, a switch 318 (i.e., the ECR/ECM module shown in FIG. 3a), and a plurality of Phys 316 in connection with the switch. Among the multiple Phys, some are reserved for internal connection with the bridge 314, for example, Phy 0 serving as an ingress Phy for the bridge, and Phy 1 serving as an egress Phy for the bridge, some are used for connecting the initiator 312, such as Phy 2, and others are directly connected with SATA or SAS devices, such as Phy 3, Phy 4 and Phy 5. The switch 318 maintains an expander routing table 328 that includes respective relationships between each Phy and an address of its associated device, which address is usually reported during discovery. For example, as illustrated in FIG. 3b, the address corresponding to Phy 2 is W, and the address corresponding to Phy 5 is Z. In operation, the expander routing table can be configured dynamically, depending on various factors including, at a given time point, how many SATA and SAS devices are connected to the expander, which ports are connected to SATA devices or SAS devices, and which port is connected to an initiator. Such information can be revealed through a device discovery process triggered by the SAS management protocol (SMP) commands.

Specifically, the discovery process starts with a device discovery request (e.g., SMP discovery request) initiated by an initiator to query the expander for its local attachments. Traditionally, a generic expander responds by reporting the collection of SAS and SATA devices attached thereto. Under this enhanced bridging approach, Phys with SATA attachments would report having SAS drives attached instead. This can be done because the expander maintains two addresses for each SATA drive: a private address known and used by the bridge for accessing the SATA drive and a public address that steers connection requests to the bridge for necessary translations between SSP and STP. Specifically, when the expander finds a direct-attached SATA drive, it creates and assigns a new SAS address maintained in the port for the drive, which address will be used to externally identify the SATA drive. This public address will also be returned as the discovery result and loaded into the routing table in a generic expander. But in a bridge-enhanced expander, the addresses to be reported for SATA targets would be those of the bridge.

Using the expander in FIG. 3b for example, Phy 0 and Phy 1 are reserved for internal bridge connections, and as a result, they would report PHY_VACANT indicating no access to the contents of these Phys. Phy 2 reports an initiator attached thereto with an address W. Phy 5 is connected to a SAS device, and thus, it reports an SSP target attached thereto with an address Z as the discovery result. In terms of Phy 3 and Phy 4, both are connected to SATA devices and have respective addresses A and B assigned by the expander. However, the SATA devices would be viewed and reported as SAS devices under the enhanced bridging approach. Accordingly, notwithstanding their connections to SATA devices and actual public addresses A and B, Phy 3 and Phy 4 would report SSP targets attached thereto with respective addresses X and Y, both corresponding to the ingress Phy of the bridge. In sum, as a result of the discovery, the initiator obtains a report of local attachments to the expander, including that Phy 0 and Phy 1 being "vacant," Phy 2 has an initiator attached thereto at the address W, and Phy 3, Phy4 and Phy 5 have SSP targets attached thereto at respective addresses X, Y and Z.

Based on the above discovery results, an initiator request can be routed to the appropriate target through the following process in the expander 310. First, the initiator request is received via Phy 2 into the switch 318. The switch then identifies a destination address from the request, and further, by referring to the expander routing table 328, determines a destination Phy to which the request should be routed. For example, if the identified address is address Z, the corresponding port is Phy 5 according to the routing table 328. In that case, the switch 318 routes the request to Phy 5, which is attached to a SAS target 324. As another example, if the identified address is address X or Y, the corresponding Phy is Phy 0, and in this case, the SSP connection from the initiator at Phy 2 is terminated at Phy 0 of the bridge, and an STP connection is initiated from Phy 1 of the bridge to the actual Phy connected to the destination SATA drive, Phy 3, for example. If the request comprises one or more Serial Management Protocol (SMP) commands, for example, a command to determine the size of the virtualized SATA drive, the request does not need to further routed to the SATA drive since the bridge already has such information. In that case, the bridge will return data to the initiator immediately after receiving the request. Another instance is when the request is a READ command in response to which data needs to be read from the SATA drive and sent back to the initiator. This can be done through a streaming or bridge process, during which the bridge, instead of terminating the SSP connection immediately, will initiate the SSP connection to gather data from the SATA drive and store such data in the bridge. Once the data in the bridge passes a certain threshold, the bridge starts another SSP or SAS connection to the initiator for the data to be returned to the initiator. In any of the above scenarios, if the routing table within the expander does not contain any port corresponding to the identified address, the initiator request can be passed from this expander to the next expander connected thereto until the appropriate target is identified.

Figure 4:
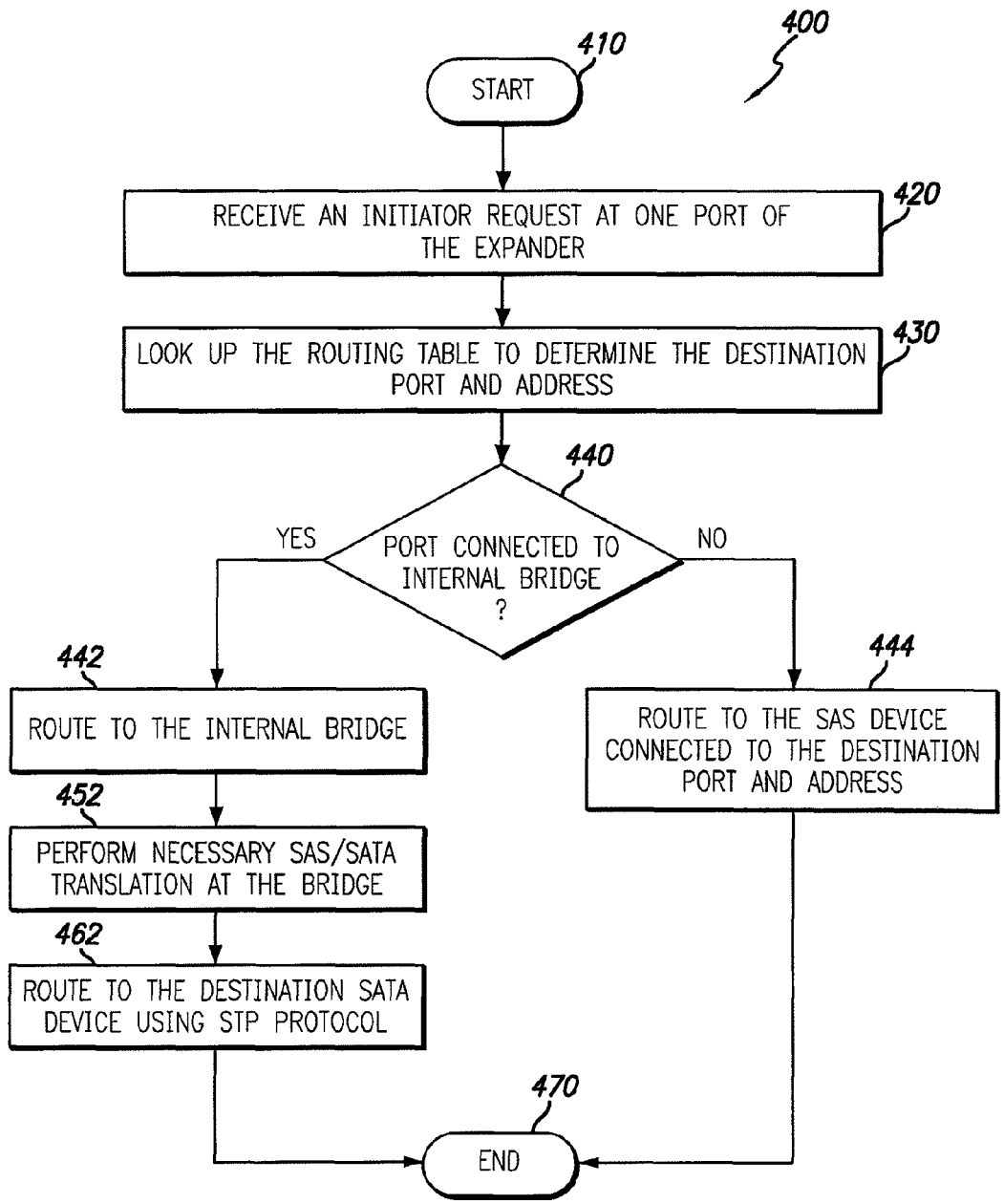
FIG. 4 is a flowchart diagram illustrating an exemplary routing and bridging process implemented within the bridge-enhanced expander of FIGS. 3a-b according to various embodiments of the present invention.

As seen from the above, the process of SAS/SATA bridging and routing is performed in a centralized internal bridge of the expander. A simplified flowchart algorithm underlying this process is demonstrated in FIG. 4 according to various embodiments of the present invention. As shown in FIG. 4, the bridging and routing process 400 implemented in a bridge-enhanced expander starts at step 410 at which a discovery process has been performed and a routing table has been created in the expander. Then the routing process proceeds to step 420 at which an initiator request is received at one of the multiple ports of the expander. Based on the initiator request, a destination address can be determined and at step 430, a switch or routing manager within the expander looks up to the routing table to identify a Phy corresponding to the destination address. At step 440, the switch or routing manager further determines whether the identified port is connected to the internal bridge of the expander or an SSP target (i.e., a SAS device). If the port is connected to an SSP target, at step 444, the request will be routed directly to the attached SAS device in accordance with the destination port and address. The routing process ends at step 470. On the other hand, if the port corresponding to the destination address turns out to be an ingress Phy attached to the internal bridge, at step 442, the SSP connection for the initiator request is terminated at the ingress Phy of the bridge. At step 452, the internal bridge performs necessary translation between different protocols with respect to the SAS initiator request and initiates an STP connection for transmitting the request converted pursuant to the STP protocol from the bridge to the destination SATA drive. At step 462, the translated STP request is routed to the destination SATA drive from the bridge, and finally, the entire routing process ends at step 470. It should be understood that the flowchart diagram in FIG. 4 only represents a high-level simplified routing and bridging process, and many variations can be incorporated according to various embodiments of the invention. Additional disclosure on the bridging function can be found in U.S. Pat. Nos. 7,353,321, 7,320,084, 7,167,929, and US Patent Application 20090003197, the contents of which are incorporated by reference in their entirety.

Figure 5A:
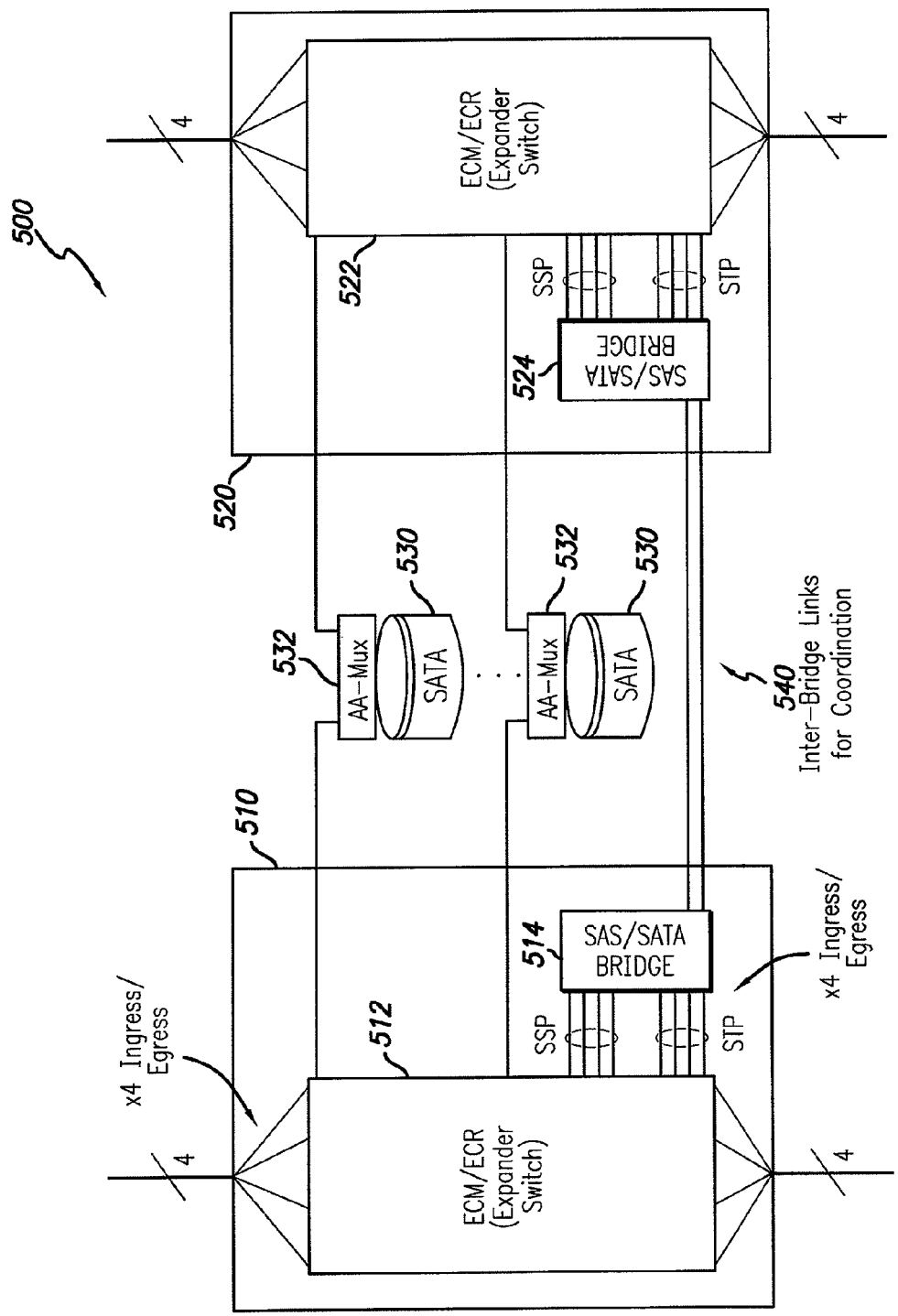
FIGS. 5a-c provide an exemplary use model incorporating the bridge-enhanced expander of FIGS. 3a-b according to various embodiments of the present invention.
Figure 5B:
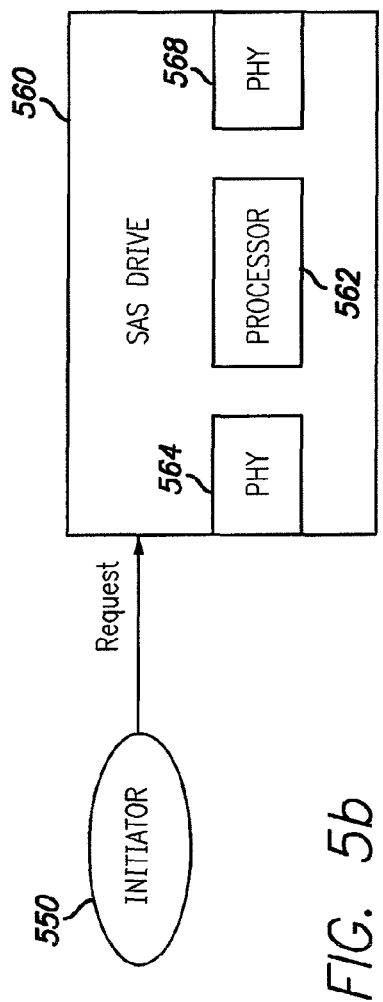
Figure 5C:
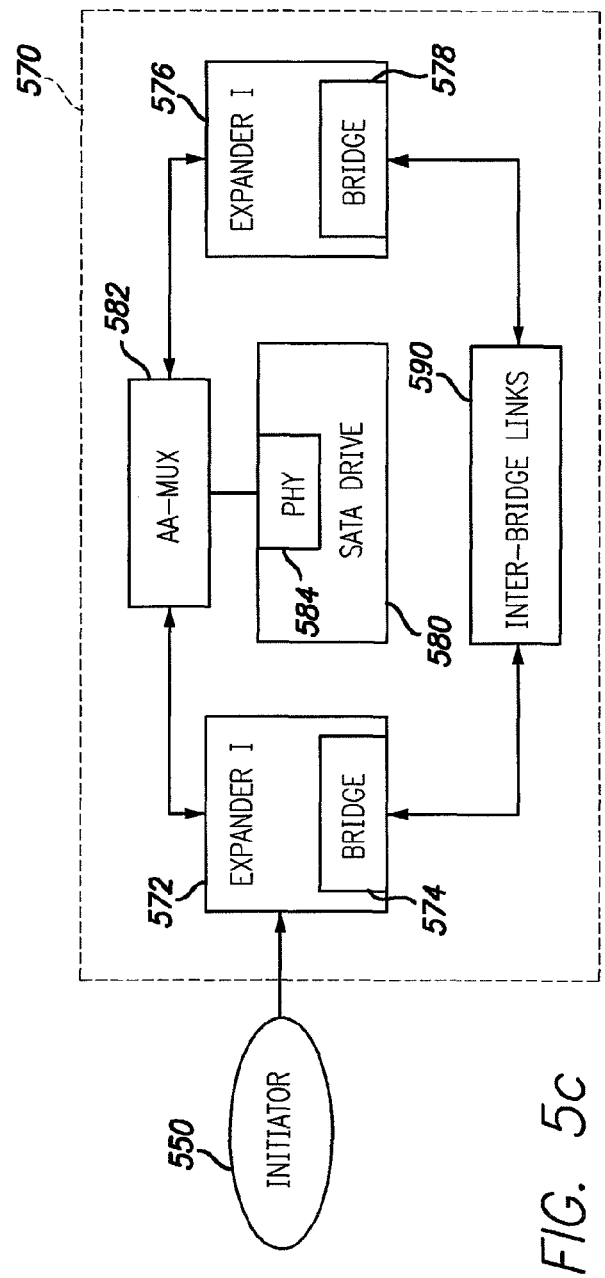

Turning to FIGS. 5a-c, an exemplary use model for the bridge-enhanced expander of FIG. 3a-b will be described according to various embodiments of the present invention. As shown in FIG. 5a, the use model 500 utilizes two interconnected expanders 510 and 520 with enhanced bridging functionalities, which can increase the system robustness and reliability. In operation, if one expander is offline, the other expander can still stay on to make sure that the communication path is available. Each expander includes a switch or ECM/ECR module, such as the switch 512 in the expander 510 and the switch 522 in the expander 520. For purposes of illustration, the switches 512 and 522 each have four ingress Phys for upstream connections and four egress Phys for downstream connections. Each of the expanders 510 and 520 also includes an internal bridge, i.e., the SAS/SATA bridges 514 and 524. The bridges share inter-bridge links 540 for necessary coordination, as will be described later with reference to FIGS. 5b-c. In addition, both expanders are connected to a plurality of SAS devices (not shown) and SATA drives 530. As shown in FIG. 5*a*, an additional component, AA-MUX 532, is employed between the SATA drives and expanders. The AA-MUX 532 is a multiplexer that allows single-ported SATA drives to connect with dual controllers, which are the two expanders 510 and 520 as illustrated in FIG. 5*a*. Because a SATA drive has a single port and only allows access by a single user, it cannot be connected to two expanders without the help of a multiplexer, such as the AA-MUX 532, which can connect to multiple ports of one or more expanders. This is different from a SAS drive that contains dual ports and can be connected to two expanders directly.

FIG. 5*b* provides a block diagram of a SAS device 560 including a processor 562 and dual ports, Phy 564 and Phy 568, which can be respectively attached to different ports of the expanders 510 and 520. When an initiator 550 sends a request to either of the expanders 510 and 520, the request can be routed to the SAS device 560 via either Phy 564 or Phy 568. Specifically, if the address in the request is associated with Phy 564, the request is routed to Phy 564 of the SAS device 560, and if the address is associated with Phy 568 instead, the request will go through Phy 568. In either case, the initiator is aware from previous interrogation of addresses that both ports refer to the same drive. This routing process can be performed in either expander independently without inter-expander coordination. In contrast, if the target is a SATA device, coordination is needed between the expanders in routing the SAS initiator request. As shown in FIG. 5*c*, the SATA drive 580 has only one port, Phy 584. As such, the SATA drive is connected to AA-MUX 582 from this single port 584, and the AA-MUX 582 is further connected to both expanders. When the initiator 550 sends a data request to the use model 570, the request begins with an Open Address Frame (OAF) that contains an address indicating which port of which expander the request should be received. In any scenario, the two expanders need to coordinate through the inter-bridge links 590. For example, if the expander 572 receives the initiator request with the SATA drive 580 being the target, the SAS/SATA bridge 574 in the expander 572 will reserve the SATA drive 580 for receiving the converted STP request. The bridge 574 also needs to notify the bridge 578 in the other expander 576 of the reservation and such notification can be transmitted over the inter-bridge links 590. Without such notification in advance or coordination otherwise, conflicts may arise when the bridges 574 and 578 concurrently reserve the SATA drive in response to the initiator request. Under the SCSI protocol, a drive can be reserved exclusively by one initiator and all other initiators cannot access the drive until after the reservation is released. This requires that, in the above demonstrated case, if the SATA drive being bridged is reserved by an initiator, the two bridges 574 and 578 need to coordinate with each other to ensure the SATA drive behave as exclusive reserved. Specifically, when a Reserve request is received at one port of the bridged device, all requests received at the other port should be denied immediately. In operation this is accomplished through the inter-bridge links.

FIGS. 5*a-c* provide an exemplary use model with two enhanced bridging expanders, although it should be understood that any number of such expanders with bridging functionalities can be used in real implementation. Note that the expander redundancy generally increases the robustness, data integrity and processing efficiency, but it also incurs additional building cost and connecting difficulty.

Figure 6:
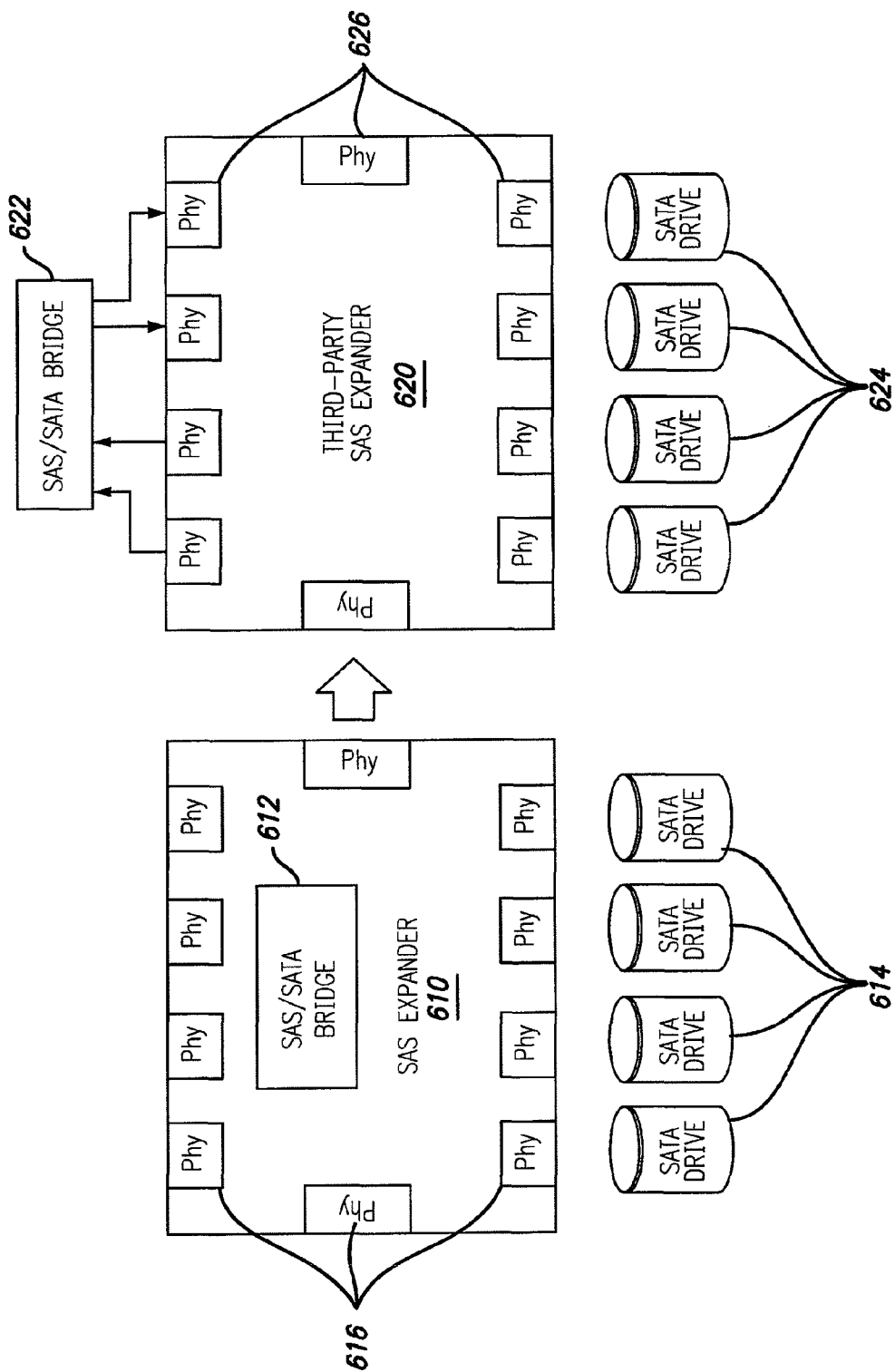
FIG. 6 illustrates a SAS/SATA bridging alternative that provides a bridge external to a SAS expander as opposed to a bridge-embedded expander according to various embodiments of the present invention.

FIG. 6 illustrates an alternative SAS/SATA bridging solution as compared to a bridge-embedded expander according to various embodiments of the present invention. As shown in FIG. 6, the enhanced expander 610 on the left side has an embedded SAS/SATA bridge 612, which is configured to execute routing and bridging instructions such as the flow chart algorithm illustrated in FIG. 4. As described above, with the bridging functionality being centralized in a bridge within the expander, the SATA drives, e.g., SATA drives 614 attached to the SAS expander 610 through multiple ports 616, would be abstracted as if they are SAS drives in a SAS domain, thereby removing STP communications from SAS initiators throughout the SAS domain. This solution reduces implementation costs, as compared to the previous de-centralized bridging solutions, such as adding a bridge at each SATA drive. However, this bridging solution also requires modifications to the existing and generic SAS expanders by including a SAS/SATA bridge, which may not be preferred by most SAS expander vendors, suppliers or users. Therefore, an alternative bridging solution, as shown on the right side of FIG. 6, is provided, which centralizes the bridging function in an ASIC chip or semiconductor external to the SAS expander. Under this approach, the SAS/SATA bridge is external to and independent of the expanders and can be easily plugged into any SAS expanders through their standard ports. No modification is required to the SAS expander 620, which can be an expander manufactured by any third-party vendor according to the SAS standard, and the bridging and routing functions are provided in the SAS/SATA bridge 622 coupled to the expander 620.

Figure 7:
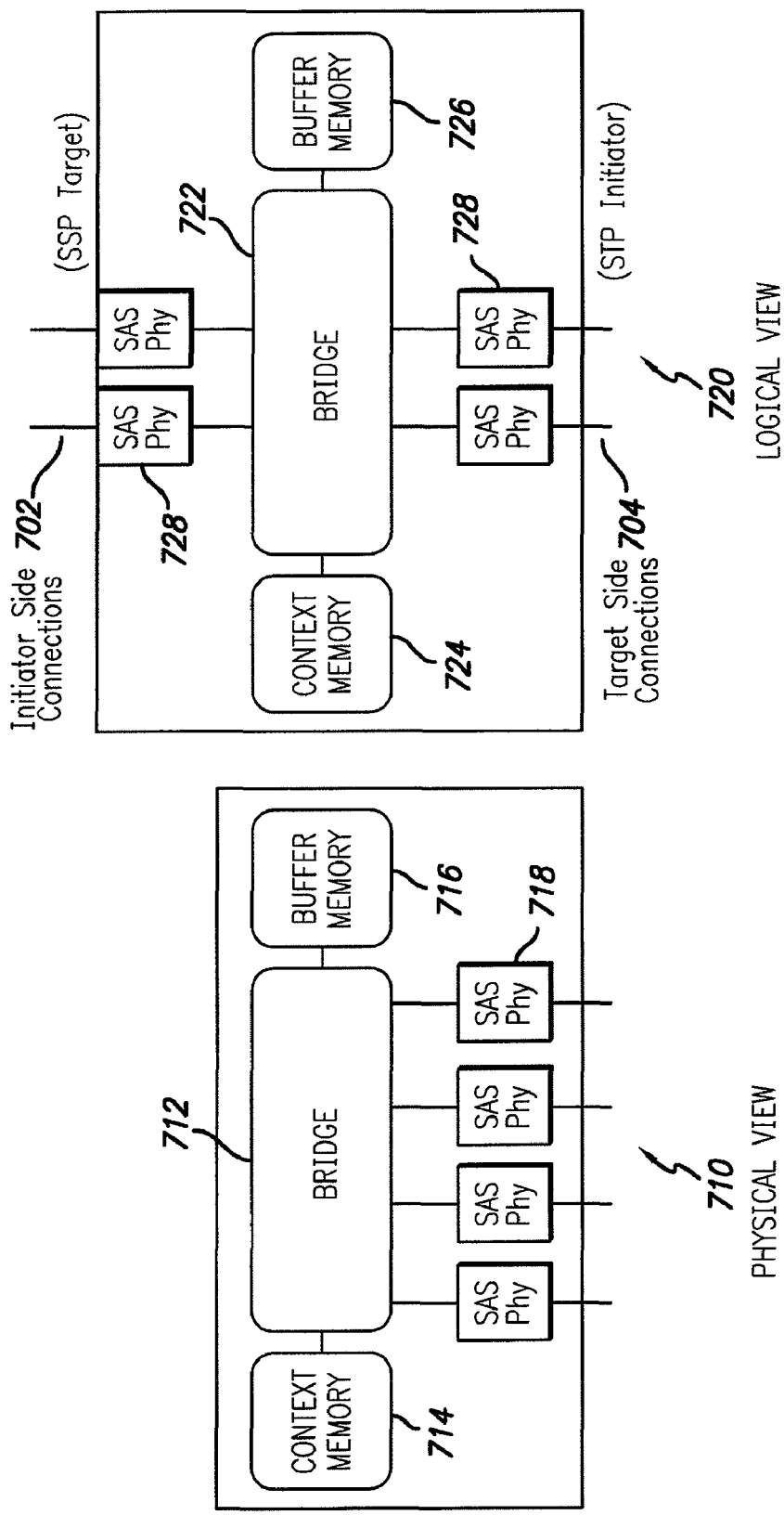
FIG. 7 provides both physical and logical views of the alternative SAS/SATA bridging solution in FIG. 6 according to various embodiments of the present invention.

FIG. 7 provides a physical view 710 and a logical view 720 of an SAS/SATA bridge external to a SAS expander according to various embodiments of the present invention. In the physical view 710, the SAS/SATA bridge external to a SAS expander contains a bridge component 712, a context memory 714, a buffer memory 716, and a plurality of SAS Phys 718 for connecting to the SAS expander. The bridge component 712 is configured with translation and bridging functionalities between SAS and SATA protocols. The buffer memory 716 stores data requests from the SAS initiator, including SSP data packets with headers and data payloads. The buffer memory 716 also stores other information generated in the process of translating SSP packets to STP packets, such as modified headers for creating STP packets. The context memory 714 maintains context information relating to the bridging and routing process for data transport to SATA drives. For example, in the event of large I/Os going through an expander with the SAS/SATA bridge attached thereto, the context memory 714 stores context information, such as what I/Os have been processed, what I/Os are still pending, how much data has been sent, and so forth.

The logical view 720 further presents how an external bridge can be used in providing the bridging and translation functions in connection with a SAS expander in the SAS domain. When the external bridge is connected to a SAS expander, the ports or SAS Phys 728 of the bridge are attached to the ports of the expander. Among the SAS Phys 728, some are used as ingress Phys for connections on the initiator side, while others are reserved as egress Phys for connections on the target side. Usually, the number of ingress Phys and that of egress Phys are equal, although many variations can be used. In operation, those SAS initiator requests with SATA devices being the target are routed to the ingress SAS Phys of the external bridge chip and the bridge component 722 performs further translation before routing the requests to the destination SATA device via STP connections. Note that four Phys are shown in both physical and logical views of the external bridge chip, but the number of Phys can be increased up to eight or more for greater I/Os per second and bigger bandwidth to local SATA targets.

Figure 8:
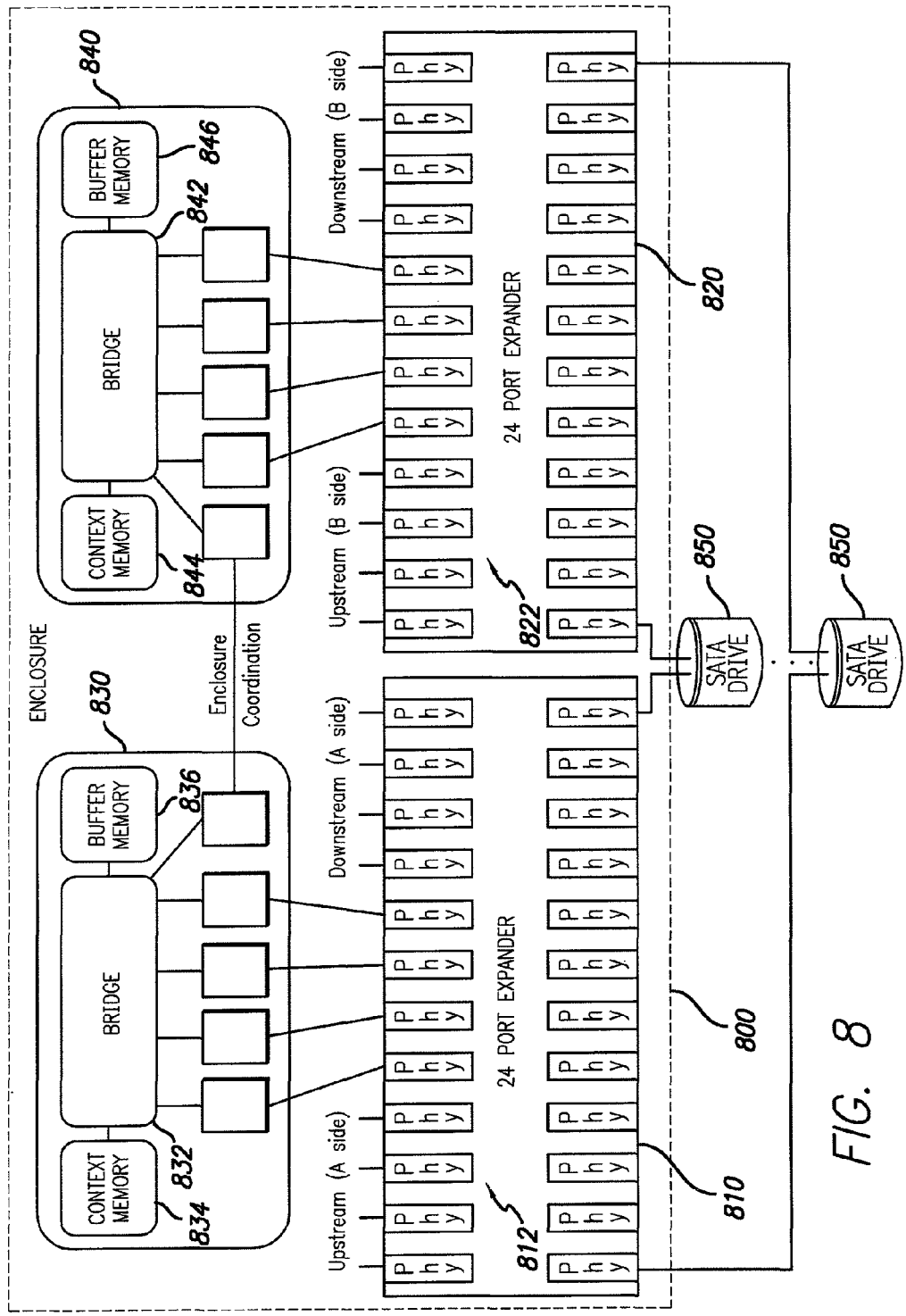
FIG. 8 provides an exemplary use model incorporating the external SAS/SATA bridge of FIGS. 6-7 according to various embodiments of the present invention.

FIG. 8 provides an exemplary use model for the external SAS/SATA bridge of FIGS. 6-7 according to various embodiments of the present invention. In this use model, two generic SAS expanders and their respectively associated external bridges are incorporated in an enclosure 800 which is connected to a plurality of SATA drives 850 through one or more AA-MUX (not shown) and SAS devices (not shown) can be directly attached. For illustration purposes, the two expanders 810 and 820 each contain 24 ports (e.g., Phys 812 and Phys 822), of which some are directly attached to SAS or SATA drives, some are reserved for upstream and downstream connections, and the others are used to connect the SAS/SATA bridge outside the expander. The bridge chip 830 is attached to the expander 810 to provide necessary SAS/SATA bridging functions with respect to SAS initiator requests to SATA drives. Similarly, the bridge chip 840 is coupled to the expander 820 to perform the same. Between the two bridge chips, another connection exists for necessary coordination in the event of persistent reservations, SCSI resets, unit attention conditions, etc.

In operation, the bridging function is performed within the bridge components 832 and 842 of the bridges. Specifically, the bridging component terminates a connection request of one protocol and initiates a request in the alternate protocol either at the same time or staggered in time. Unlike the above-described enhanced expanders with bridges embedded therein, the external bridge does not provide one-to-one corresponding relationships between SAS and SATA translation. Instead, a limited number of Phys are offered to advertise targets to initiators, and multiple SATA drives may share the same Phy and be virtualized as a block in which each SATA drive exists as a LUN in a single virtualized SAS drive. Again, FIG. 8 presents a use model incorporating two expanders with two interconnected bridges, but embodiments of the invention are not so limited, and can vary in different implementations.

Embodiments of the present invention may be described in the general context of processor-executable instructions. Processor-executable instructions may include programs, applications, coding, modules, objects, interfaces, components, data structures, frame organizations and/or preamble content, etc. that perform and/or enable the performance of particular tasks and/or implement particular data structures. Processor-executable instructions may be located in separate storage media, executed by different processors, and/or propagated over or extant on various transmission media. Moreover, processor-executable instructions may be embodied as software, firmware, hardware, fixed logic circuitry, some combination thereof, and so forth.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method of bridging between Serial ATA (SATA) and Serial Attached Small Computer System Interface (SAS) protocols in a computer storage network comprising at least an expander that includes multiple Phys indicative of multiple ports, said storage network further comprising a plurality of SAS devices and/or SATA devices directly attached to said expander, said method comprising:
   creating a bridge capable of performing translations between SAS and SATA protocols, said bridge embedded in or coupled to said expander through two or more Phys amongst said multiple Phys of said expander, said two or more Phys comprising at least an ingress Phy and an egress Phy attached to said bridge; and
   routing a SAS initiator request to said bridge based on a routing table in said expander before said initiator request is translated at said bridge and further routed from said bridge to a destination SATA device attached to said expander,
   wherein said routing table includes public addresses of said SAS and SATA devices and corresponding Phys through which said SAS and SATA devices are attached to said expander,
   wherein said SAS initiator request indicates a destination address that corresponds to said ingress Phy of said bridge according to said routing table, and
   wherein said SATA devices including said destination SATA device are virtualized as Serial SCSI Protocol (SSP) targets during a SAS discovery process.

2. The method of claim 1, wherein each SAS or SATA device is directly attached to said expander via at least one of said multiple Phys of said expander.

3. The method of claim 1, further comprising:
   receiving said SAS initiator request from a SAS initiator attached to said expander via one of said multiple Phys of said expander.

4. The method of claim 1, further comprising:
   receiving said SAS initiator request at a switch module of said expander, wherein said switch module stores said routing table and is configured to route any received initiator request to one of said multiple Phys of said expander according to said routing table.

5. The method of claim 1, wherein said routing table further includes one or more assigned addresses corresponding to said ingress Phy of said bridge.

6. The method of claim 5, wherein said discovery process comprises:
   receiving a discovery request at said expander, said discovery request investigating each Phy of said multiple Phys of said expander to discover its local attachment;
   in response to said discovery request, reporting from a first Phy attached to a SAS device that said first Phy is attached to an SSP target, and the address of said SSP target is the unique SAS address of said SAS device; and
   reporting from a second Phy attached to a SATA device that said second Phy is also attached to an SSP target instead of a Serial ATA Tunneling Protocol (STP) target, and the address of said SSP target is an assigned address selected from said one or more assigned addresses instead of a unique address assigned to said SATA device.

7. The method of claim 6, wherein said discovery process further comprises:
   reporting from said two or more Phys attached to said bridge that no device is locally attached to these Phys.

8. The method of claim 5, wherein said destination address is determined to match at least one of said one or more assigned addresses corresponding to said ingress Phy of said bridge.

9. The method of claim 1, further comprising:
   terminating an SSP connection for said SAS initiator request at said ingress Phy of said bridge;
   translating said SAS initiator request into an STP request at said bridge;
   determining a destination Phy through which said destination SATA device is connected to said expander;
   initiating an STP connection from said egress Phy of said bridge to said destination Phy; and transmitting said STP request over said STP connection to said destination SATA device.

10. The method of claim 9, wherein during said discovery process, said destination Phy connected to said destination SATA device reports that it is attached to an SSP target and the address of said SSP target is said destination address.

11. The method of claim 9, further comprising:
in response to said STP request, reading data from said destination SATA device and storing said data to said bridge; and
initiating another SAS connection from said egress Phy of said bridge to an initiator and sending said data from said bridge to said initiator when said data in said bridge exceeds a predetermined threshold.

12. The method of claim 1, further comprising:
determining that said SAS initiator request comprises a Serial Management Protocol (SMP) command;
retrieving and returning data from said bridge to an initiator sending said initiator request; and
terminating an SSP connection established for said SAS initiator request.

13. The method of claim 1, further comprising:
receiving and routing another SAS initiator request directly to a destination SAS device based on said routing table, wherein said another SAS initiator request indicates a destination address that, according to said routing table, corresponds to a destination Phy through which said destination SAS device is attached to said expander.

14. The method of claim 1, wherein said discovery process is performed under one or more Serial Management Protocol (SMP) commands.

15. The method of claim 1, wherein said computer storage network is a Storage Area Network (SAN).

16. An expander configured for bridging between Serial ATA (SATA) and Serial Attached Small Computer System Interface (SAS) protocols in a computer storage network, said storage network comprising a plurality of SAS devices and SATA devices directly attached to said expander, said expander comprising:
a plurality of ports represented by a plurality of Phys;
a bridge internally attached to two or more Phys amongst said plurality of Phys, said two or more Phys comprising at least an ingress Phy and an egress Phy attached to said bridge, said bridge capable of performing translations between SAS and SATA protocols; and
a switch configured to establish connections and route data between said plurality of Phys, said switch including a routing table that comprises public addresses of said SAS and SATA devices and corresponding Phys through which said SAS and SATA devices are directly attached to said expander, and one or more assigned addresses corresponding to said ingress Phy of said bridge,
wherein said switch is further configured to route a SAS initiator request based on said routing table to either a destination SAS device directly or said bridge for translation before it is transmitted to a destination SATA device.

17. The expander of claim 16, further comprising a plurality of port engines respectively coupled to said plurality of ports.

18. The expander of claim 16, wherein said bridge comprises one or more protocol processors configured to translate data packets between SAS and SATA protocols.

19. The expander of claim 16, wherein said SAS initiator request is received in said expander from a source SAS device attached to at least one Phy amongst said plurality of Phys.

20. The expander of claim 19, wherein said switch is further configured to establish an SSP connection between said at least one Phy connected to said source SAS device and a destination Phy through which said destination SAS device is connected to said expander, and route said initiator request to said destination SAS device over said SSP connection if said initiator request contains a destination address that corresponds to said destination Phy according to said routing table.

21. The expander of claim 19, wherein said switch is further configured to establish an SSP connection between said at least one Phy connected to said source SAS device and said ingress Phy of said bridge, and route said initiator request to said bridge over said SSP connection if said initiator request contains a destination address that matches one of said one or more assigned addresses corresponding to said ingress Phy of said bridge.

22. The expander of claim 21, wherein said bridge is configured to:
receive and translate said SAS initiator request into an STP request;
initiate an STP connection from said egress Phy of said bridge to a destination Phy through which said destination SATA device is attached to said expander; and
transmit said STP request over said STP connection to said destination SATA device.

23. The expander of claim 22, wherein said destination Phy reports that it is connected to an SSP target, and the address of said SSP target is said destination address during a discovery process performed in said expander.

24. The expander of claim 16, wherein said SATA devices attached to said expander are virtualized as SSP targets as a result of a discovery process, said discovery process comprising:
receiving an SMP discovery request at said expander to investigate local attachments of said plurality of Phys of said expander;
in response to said discovery request, reporting from a first Phy attached to a SAS device that said first Phy is attached to an SSP target, and the address of said SSP target is the unique SAS address of said SAS device; and
reporting from a second Phy attached to a SATA device that said second Phy is also attached to an SSP target instead of a STP target, and the address of said SSP target is an assigned address selected from said one or more assigned addresses instead of a unique address assigned to said SATA device.

25. The expander of claim 24, wherein said discovery process further comprises:
reporting a PHY_VACANT message from said two or more Phys attached to said bridge.

26. A bridging apparatus configured for bridging between Serial ATA (SATA) and Serial Attached Small Computer System Interface (SAS) protocols in a computer storage network, said storage network comprising at least an expander coupled to said bridging apparatus, and a plurality of SAS devices and SATA devices connected to the expander, said bridging apparatus comprising:
a plurality of Phys corresponding to two or more Phys in said expander, said two or more Phys including at least an ingress Phy and an egress Phy through which said bridge apparatus is attached to said expander;
a bridge component coupled to said plurality of Phys, said bridge component capable of performing translations between SAS and SATA protocols;
a context memory accessible to said bridge component, said context memory storing information relating to Inputs/Outputs (I/Os) going through said expander; and a buffer coupled to said bridge component, said buffer configured to store data relating to any received SAS initiator requests, wherein said bridge component is configured to receive a SAS initiator request from said expander at said ingress Phy, translate said initiator request into an STP request and route said STP request to a destination SATA device attached to said expander, and wherein said SAS initiator request indicates a destination address that corresponds to said ingress Phy according to a routing table in said expander, said routing table including public addresses of said SAS and SATA devices and corresponding Phys in said expander through which said SAS and SATA devices are directly attached to said expander, and one or more assigned addresses corresponding to said ingress Phy.

27. The bridging apparatus of claim 26, further comprising one or more inter-bridge links that facilitate coordination between said bridging apparatus and a peer bridge.

28. The bridging apparatus of claim 26, wherein said bridge component comprises one or more protocol processors configured to translate data packets between SAS and SATA protocols.

29. The bridging apparatus of claim 28, wherein said expander includes a switch configured to establish connections and route data between different Phys of said expander.

30. The bridging apparatus of claim 29, wherein said switch is further configured to route another SAS initiator request directly to a destination SAS device based on said routing table, wherein said another SAS initiator request indicates a destination address that, according to said routing table, corresponds to a destination Phy through which said destination SAS device is attached to said expander.

31. The bridging apparatus of claim 27, wherein said SAS initiator request is received in said expander from a source SAS device attached to at least one Phy of said expander.

32. The bridging apparatus of claim 29, wherein said switch is further configured to determine that said destination address matches one of said one or more assigned addresses corresponding to said ingress Phy in said routing table.

33. The bridging apparatus of claim 32, wherein said switch is further configured to establish an SSP connection between said at least one Phy connected to said source SAS device and said ingress Phy, and route said initiator request to said bridge apparatus over said SSP connection.

34. The bridging apparatus of claim 33, wherein said bridge component is further configure to initiate an STP connection from said egress Phy to a destination Phy through which said destination SATA device is attached to said expander, and transmit said STP request over said STP connection to said destination SATA device.

35. The bridging apparatus of claim 34, wherein said destination Phy reports that it is connected to an SSP target, and the address of said SSP target is said destination address during a discovery process performed in said expander.

36. The bridging apparatus of claim 35, wherein said discovery process comprises:
receiving a discovery request at said expander, said discovery request investigating each Phy of said expander to discover its local attachment;
in response to said discovery request, reporting from a first Phy attached to a SAS device that said first Phy is attached to an SSP target, and the address of said SSP target is the unique SAS address of said SAS device; and
reporting from a second Phy attached to a SATA device that said second Phy is also attached to an SSP target instead of a STP target, and the address of said SSP target is an assigned address selected from said one or more assigned addresses instead of a unique address assigned to said SATA device.

37. The bridging apparatus of claim 36, wherein said discovery process further comprises reporting a PHY_VACANT message from Phys through which said bridge apparatus is attached to said expander.

38. A computer-readable storage medium comprising processor-executable instructions for bridging between Serial ATA (SATA) and Serial Attached Small Computer System Interface (SAS) protocols, said processor-executable instructions, when executed, causing a processor to:
receive a SAS initiator request from a SAS source device attached to an expander at one of multiple Phys of said expander;
determine a destination address from said initiator request;
determine a Phy corresponding to said destination address from a routing table, said routing table including public addresses of a plurality of SAS devices and SATA devices directly attached to said expander and their corresponding Phys in said expander, and one or more assigned addresses corresponding to an ingress Phy of a bridge embedded in or coupled to said expander, said bridge capable of performing translations between SAS and SATA protocols;
route said SAS initiator request to a destination SAS device if said destination address matches a public address of said destination SAS devices in accordance with said routing table; and
route said SAS initiator request to said bridge for translation before transmitting to a destination SATA device if said destination address matches one of said one or more assigned addresses corresponding to said ingress Phy of said bridge in accordance with said routing table.

39. The computer-readable storage medium of claim 38, comprising further processor-executable instructions, when executed, causing a processor to:
create an SSP connection between a Phy through which said source SAS device is connected to said expander and a destination Phy through which said destination SAS device is attached to said expander; and
route said initiator request to said destination SAS device over said SSP connection.

40. The computer-readable storage medium of claim 38, comprising further processor-executable instructions, when executed, causing a processor to:
create an SSP connection between a Phy through which said source SAS device is connected to said expander and said ingress Phy of said bridge; and
route said initiator request to said bridge over said SSP connection.

41. The computer-readable storage medium of claim 40, wherein said bridge is configured to:
translate said SAS initiator request into an STP request;
initiate an STP connection from an egress Phy of said bridge to a destination Phy through which said destination SATA device is attached to said expander; and
transmit said STP request over said STP connection to said destination SATA device.

42. The computer-readable storage medium of claim 38, comprising further processor-executable instructions, when executed, causing a processor to:
receive a discovery request to discover local attachments to each Phy of said expander;
in response to said discovery request, report from a first Phy attached to a SAS device that said first Phy is attached to an SSP target, and the address of said SSP target is the unique SAS address of said SAS device;

report from a second Phy attached to a SATA device that said second Phy is also attached to an SSP target instead of a STP target, and the address of said SSP target is an assigned address selected from said one or more assigned addresses instead of a unique address assigned to said SATA device; and report from two or more Phys attached to said bridge that no device is locally attached to said Phys.

43. The computer-readable storage medium of claim 38, wherein a Storage Area Network (SAN) comprises said SAS devices and SATA devices, and said expander attached to said SAS and SATA devices.

44. A method of virtualizing a SATA device as an SAS device from an initiator perspective in a computer storage network comprising at least an expander that includes multiple Phys indicative of multiple ports, said storage network further comprising a plurality of SAS devices and/or SATA devices directly attached to said expander, said method comprising:

receiving a discovery request at said expander, said discovery request investigating each Phy of said multiple Phys of said expander to discover its local attachment;

in response to said discovery request, reporting from a first Phy attached to a SAS device that said first Phy is attached to an SSP target, and an address of said SSP target is the unique SAS address of said SAS device; and reporting from a second Phy attached to a SATA device that said second Phy is also attached to an SSP target instead of a Serial ATA Tunneling Protocol (STP) target, and an address of said SSP target is an assigned address selected from one or more assigned addresses stored in a routing table instead of a unique address assigned to said SATA device, said one or more assigned addresses corresponding to an ingress Phy of a bridge embedded in or coupled to said expander, said bridge capable of performing translations between SAS and SATA protocols.

45. The method of claim 44, further comprising:
reporting from two or more Phys attached to said bridge that no device is locally attached to these Phys.

46. The method of claim 44, wherein said routing table is stored in said expander, and includes public addresses of said SAS and SATA devices and corresponding Phys through which said SAS and SATA devices are directly attached to said expander, and said one or more assigned addresses corresponding to said ingress Phy of said bridge.

47. The method of claim 44, further comprising:
receiving said SAS initiator request from a SAS initiator attached to said expander via at least one of said multiple Phys of said expander;

routing a SAS initiator request to a destination SAS device if a destination address of said initiator request matches a public address of said destination SAS devices in accordance with said routing table; and routing said SAS initiator request to said bridge for translation before transmitting to a destination SATA device if said destination address matches one of said one or more assigned addresses corresponding to said ingress Phy of said bridge in accordance with said routing table.

48. A computer-readable storage medium comprising processor-executable instructions for virtualizing a SATA device as an SAS device from an initiator perspective in a computer storage network comprising at least an expander that includes multiple Phys indicative of multiple ports, said storage network further comprising a plurality of SAS devices and/or SATA devices directly attached to said expander, said processor-executable instructions, when executed, causing a processor to:

receive a discovery request at said expander, said discovery request investigating each Phy of said multiple Phys of said expander to discover its local attachment;

in response to said discovery request, report from a first Phy attached to a SAS device that said first Phy is attached to an SSP target, and an address of said SSP target is the unique SAS address of said SAS device; and report from a second Phy attached to a SATA device that said second Phy is also attached to an SSP target instead of a Serial ATA Tunneling Protocol (STP) target, and an address of said SSP target is an assigned address selected from one or more assigned addresses stored in a routing table instead of a unique address assigned to said SATA device, said one or more assigned addresses corresponding to an ingress Phy of a bridge embedded in or coupled to said expander, said bridge capable of performing translations between SAS and SATA protocols.

49. The computer-readable storage medium of claim 48, comprising further processor-executable instructions, when executed, causing a processor to:
report from two or more Phys attached to said bridge that no device is locally attached to these Phys.

50. The computer-readable storage medium of claim 48, comprising further processor-executable instructions, when executed, causing a processor to:
receive said SAS initiator request from a SAS initiator attached to said expander via at least one of said multiple Phys of said expander;

route a SAS initiator request to a destination SAS device if a destination address of said initiator request matches a public address of said destination SAS devices in accordance with said routing table; and route said SAS initiator request to said bridge for translation before transmitting to a destination SATA device if said destination address matches one of said one or more assigned addresses corresponding to said ingress Phy of said bridge in accordance with said routing table.

51. The method of claim 48, wherein said routing table is stored in said expander, and includes public addresses of said SAS and SATA devices and corresponding Phys through which said SAS and SATA devices are directly attached to said expander, and said one or more assigned addresses corresponding to said ingress Phy of said bridge.

* * * * *